(12) United States Patent
Gibson et al.

(10) Patent No.: US 7,885,916 B2
(45) Date of Patent: Feb. 8, 2011

(54) SOLUTION FOR PROVIDING REAL-TIME VALIDATION OF TEXT INPUT FIELDS USING REGULAR EXPRESSION EVALUATION DURING TEXT ENTRY

(75) Inventors: Becky J. Gibson, Westford, MA (US); Douglas E. Hays, Nicholasville, KY (US); William M. Keese, III, Sapporo (JP); Adam L. Peller, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 11/943,187

(22) Filed: Nov. 20, 2007

(65) Prior Publication Data

US 2009/0132950 A1    May 21, 2009

(51) Int. Cl.
*G06F 17/00* (2006.01)
*G06N 5/02* (2006.01)
(52) U.S. Cl. ........................................................ 706/47
(58) Field of Classification Search .................... 706/47
See application file for complete search history.

(56) References Cited

U.S. PATENT DOCUMENTS 7,627,818 B2 * 12/2009 Hays ........................... 715/269
7,657,840 B2 *  2/2010 Gibson et al. ............... 715/769
7,657,844 B2 *  2/2010 Gibson et al. ............... 715/827

* cited by examiner

*Primary Examiner*—Michael Holmes
(74) *Attorney, Agent, or Firm*—Patents on Demand, P.A.; Brian K. Buchheit; Scott M. Garrett

(57) ABSTRACT

The present invention discloses a system for providing real-time validation of text input fields in a Web page during text entry. Such a system can include a validation-enhanced text input element and an input text validator. The validation-enhanced text input element can be configured to contain a validation expression for a text field in a Web page. The validation-enhanced text input element can be contained in the source code document that corresponds to the Web page. The input text validator can be configured to validate a character entered into the text field against the validation expression in real-time. Characters determined as invalid can be visually indicated by the input text validator in the text field.

20 Claims, 2 Drawing Sheets

SOLUTION FOR PROVIDING REAL-TIME VALIDATION OF TEXT INPUT FIELDS USING REGULAR EXPRESSION EVALUATION DURING TEXT ENTRY

BACKGROUND

1. Field of the Invention

The present invention relates to the field of Web page development and, more particularly, to providing real-time validation feedback for text input fields using regular expression evaluation during text entry.

2. Description of the Related Art

The Internet has become a vital means of conducting business. Consumers visit a multitude of Web sites to purchase items, subscribe to newsletters, share information, and other such activities. Many Web sites utilize Web forms to collect necessary information from a user. For example, a user typically needs to provide a valid email address when subscribing to a newsletter.

A persistent problem that plagues Web form fields is the proper formatting of data into text fields. A disconnect often exists between a developer and a user as to the proper or an acceptable format for a specific text field. For example, a social security number can be entered with or without dashes.

Web developers often resort to providing an example of the expected formatting in the Web form. However, this does not guarantee that the user will enter the data accordingly. Thus, many developers employ a variety of scripts to validate the formatting of entered data.

The conventional implementations of these validation scripts, while useful, create an additional set of issues. Conventional validation scripts determine the validity of an inputted text string in its entirety regardless of how many characters are acceptable. For example, if a user mistypes a comma instead of a period in their email address, the entire email text field is flagged as invalid. Many forms clear text fields that have been flagged as invalid, which increases a user's frustration and does not offer assistance in correcting the error.

Conventional validation scripts require that the developer include all possible valid and/or invalid character permutations in the actual code. The inclusion of these permutations increases script size and decreases performance. Additionally, future modifications to the range of valid permutations can result in having to rewrite the entire script.

What is needed is a solution that provides real-time validation feedback during entry into a text input field. That is, characters are validated as they are inputted with invalid characters being visually accentuated. For example, any numbers accidentally typed into the text field for a city name would be highlighted. Ideally, this solution would leverage regular expressions to define expected input formats.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
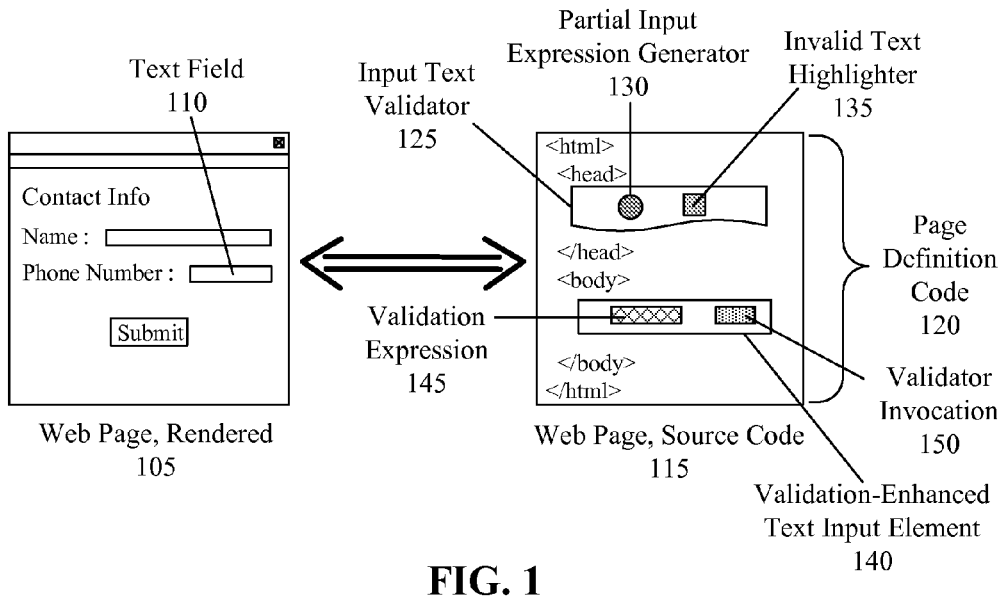
FIG. 1 is a schematic diagram illustrating a system for providing real-time validation of text input fields in a Web page in accordance with embodiments of the inventive arrangements disclosed herein.

FIG. 1 is a schematic diagram illustrating a system 100 for providing real-time validation of text input fields 110 in a Web page 105 in accordance with embodiments of the inventive arrangements disclosed herein. In system 100, the Web page source code 115 can be interpreted by a typical Web browser (not shown) to produce the rendered Web page 105.

The text field 110 displayed in the rendered Web page 105 can be a control mechanism by which a user can enter text characters. The use of text fields 110 in Web pages 105 can be a common means of capturing user-entered information. As shown in this example, text field 110 is a field meant for a user to enter characters representing a phone number.

The text field 110 can be represented by a validation-enhanced text input element 140 in the Web page source code 115. The Web page source code 115 can represent the language syntax required to produce a desired rendered Web page 105. The Web page source code 115 can be written in a variety of standardized languages that can be interpreted by a Web browser, including, but not limited to, hypertext markup language (HTML), extensible HTML (XHTML), and other languages supporting textual input fields.

The Web page source code 115 shown in this example is HTML. It should be noted that the use of HTML is for illustrative purposes only and not meant as a limitation of the present invention. The Web page source code 115 can consist of page definition code 120. The page definition code 120 can be the language elements necessary for the source code 115 to be interpreted as the Web browser as the rendered Web page 105, such as the standard HTML tags shown in this example.

The page definition code 120 can include a validation-enhanced text input element 140. The validation-enhanced text input element 140 can represent the code element within the page definition code 120 that defines the text field 110 of the rendered Web page 105. In this example, the validation-enhanced text input element 140 can be an HTML input tag with the input attribute set to "text".

The validation-enhanced text input element 140 can include a validation expression 145 and a validator invocation 150. The validation expression 145 can be an attribute of the validation-enhanced text input element 140 that defines the set of valid characters and/or character positions for text entered into the text field 110. The validation expression 145 can be written using a set of symbols and syntactic elements used to match patterns of text. For example, the validation expression 145 can be written as a regular expression. Unlike previous validation expressions 145 of the past that only executed after all field 110 input was provided, the expression 145 is activated when partial input is provided. That is, each time a character is entered into the text field 110, the expression 145 can be checked to ensure that the entered character is permitted, as determined by expression 145.

The validator invocation 150 can be an element of the validation-enhanced text input element 140 that invokes the input text validator 125 upon entry of a character into the text field 110. For example, the validator invocation 150 can be an intrinsic event handler element of a scripting language that calls the input text validator 125.

The input text validator 125 can be a software program designed to determine the validity of a character entered into the text field 110 against the validation expression 145 of the corresponding validation-enhanced text input element 140. The input text validator 125 can be contained within the source code document 115, as shown in this example.

In another embodiment, the input text validator 125 can be contained in an external document that is programmatically linked to the Web page source code 115. For example, the JAVASCRIPT code for the input text validator 125 can be contained in a SCRIPT tag within the HEAD tag of the HTML page definition code 120 or can be contained in a separate document that is accessible to the source code document 115.

It should be noted that the format of the validation expression 145 should be written in a manner supported by the input text validator 125 or in a manner that can be transformed into a format supported by the validator 125. For instance, if the input text validator 125 is written in JAVASCRIPT, then the syntax used in the validation expression 145 can be interpretable by JAVASCRIPT (or can be of a syntax able to be transformed so that it is interpretable by a JAVASCRIPT validator 125). In other words, different programming languages provide support for different regular expression syntactic elements, which can be a consideration when determining which language the input text validator 125 is to be coded in and when determining a syntax used for defining expression 145. The placement and/or location of the code for the input text validator 125 should be designed to easily interoperate with the languages being used for the input text validator 125 and the Web page 115.

The input text validator 125 can include a partial input expression generator 130 and an invalid text highlighter 135. The partial input expression generator 130 can represent a component of the input text validator 125 that can expand the validation expression 145 so that substrings of the entered characters are evaluated.

Therefore, the expanded version of the validation expression 145 can allow for the input text validator 125 to continue determining the validity of entered characters even when invalid characters have been entered. For example, using a validation expression 145 stating that only numeric characters (e.g., 0, 1, . . . , 9) are valid, the input text validator 125 can continue to assess the validity of entered characters after the entry of non-numeric character.

It should be emphasized that this feature is not currently performed in conventional text field validation implementations. Conventional implementations typically do not validate characters on entry. Text field data is usually validated in its entirety after the user has completed entry. As such, a conventional implementation often terminates validation once the presence of an invalid character has been detected; the remaining characters of the text string are not validated. In such a situation, a conventional implementation can fail to detect all invalid characters; a conventional implementation can require multiple iterations of the validation code to detect all of the invalid characters contained in the entered text.

The invalid text highlighter 135 can represent a component of the input text validator 125 that can highlight characters within the text field 110 that have been determined as invalid. Implementation of the invalid text highlighter 135 can depend upon the implementation of the input text validator 125 and the type of source code document 115 used.

It should be emphasized that the highlighting of individual characters that are deemed invalid for the text field 110 is another feature lacking in conventional implementations. The invalid text highlighter 135 can represent a sophisticated control that is currently unavailable to Web page developers. Further, this approach can reduce the user frustration currently experienced with conventional implementations that only indicate that there is an invalid character in the text field without communicating which character is invalid.

In one embodiment, system 100 can be configured to support Web Accessibility (a11y) so that input provided by people with disabilities is validated in real time. For instance, system 100 can help people with cognitive disabilities by providing immediate feedback as characters are being input. Those with mobility impairments or using assistive technology may have difficulty navigating through a web document with many controls. Immediate validation can help them to correct mistakes in real time so they do not have to navigate back to a control at a later time to correct errors.

In another embodiment, specifics of system 100 can be internationalized (i18n) so that it can be localized without changes being made to the source code 115. For example, the partial input expression generator 130 can be customized so that it can validate user input using localized conventions.

Figure 2:
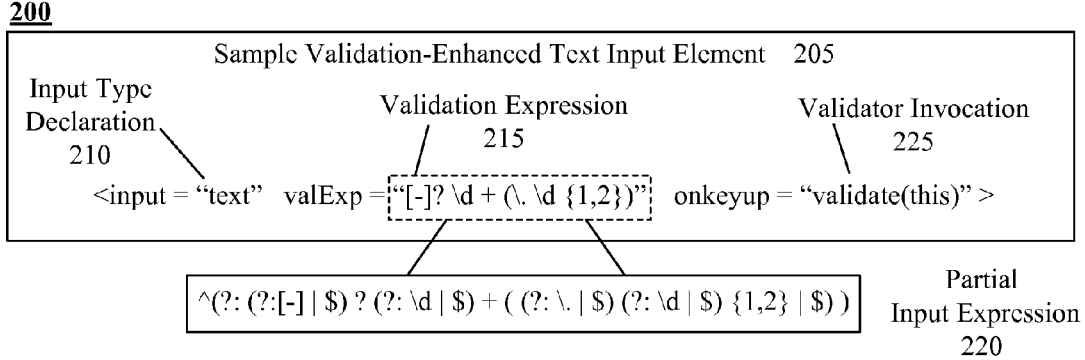
FIG. 2 is a collection of sample operations for providing real-time validation of a text input field in a Web page in accordance with an embodiment of the inventive arrangements disclosed herein.

FIG. 2 is a collection 200 of sample operations for providing real-time validation of a text input field in a Web page in accordance with an embodiment of the inventive arrangements disclosed herein. The sample operations of collection 200 can be performed in the context of system 100 or any other system supporting the use of validation expressions within the input elements that define text fields in a Web page for real-time validation of user-entered characters.

Collection 200 can include a sample validation-enhanced text input element 205 and a sample character validation operations table 230. In this example, the sample validation-enhanced text input element 205 is an HTML input tag. As such, this example uses example elements that can be specific to an HTML implementation for illustrative purposes only.

The sample validation-enhanced text input element 205 can include an input type declaration 210, a validation expression 215, and a validator invocation 225. The input type declaration 210 can be an attribute of the validation-enhanced text input element 205 that indicates the type of input associated with the field. The validator invocation 225 can represent the means by which the input text validator is invoked to validate entered characters. In this example, the validator invocation 225 is a JAVASCRIPT event handler that calls a validate function.

In this example, the validation expression 215 is represented as a regular expression value for an attribute called "valExp". This expression 215 can define the valid data format for the text field as a floating point number with at least one leading digit, one or two decimal places, and an optional minus sign. Such a format can be typical of a text field where a user can enter data representing a monetary value.

In order to evaluate the validity of each entered character, the validation expression 215 can be processed to produce a partial input expression 220. Processing of the validation expression 215 can be performed by a component of the input text validator, such as the partial input expression generator 130 of system 100.

The partial input expression 220 can represent a version of the validation expression 215 that allows for each entered character to be evaluated without the invalidating the text field as a whole. For example, the first number entered into the field should not be marked as invalid, since the user has not yet finished entry. Thus, the partial input expression 220 can be written to account for multiple character entries into the text field.

Additionally, the partial input expression 220 can allow for substrings of the characters entered into the text field to be validated, which can allow for characters entered after an invalid character to be validated. For example, the characters "1q2" are entered into the text field corresponding to the sample validation-enhanced text input element 205. Using the validation expression 215, characters from the "q" on are evaluated as invalid, since the letter "q" disrupts the format defined in the validation expression 215. Using the partial input expression 220, only the letter "q" is marked as invalid, since "2" and "12" are valid partial inputs of the entered character string.

The sample character validation operations table 230 can illustrate the validation determination 240 of various input characters 235 entered into the text field defined by the validation-enhanced text input element 205. As shown in this example, the entry of a minus sign is determined as valid, since a minus sign is defined as an optional first character.

The number "9" is determined as valid because it is a numeric digit. "M" and "T" are letters and, therefore, determined as invalid. These invalid characters can be highlighted to visually draw the user's attention to them.

The period is a valid character at this point since there is at least one leading character; the substring "-9." is a valid substring for the partial input expression 220. The number "8" is also deemed valid because it is a numeric digit following the period.

It is important to note that the invalid characters remain highlighted while the proceeding characters are input. The removal or replacement of invalid characters can continue the validation process with the new text string.

Figure 3:
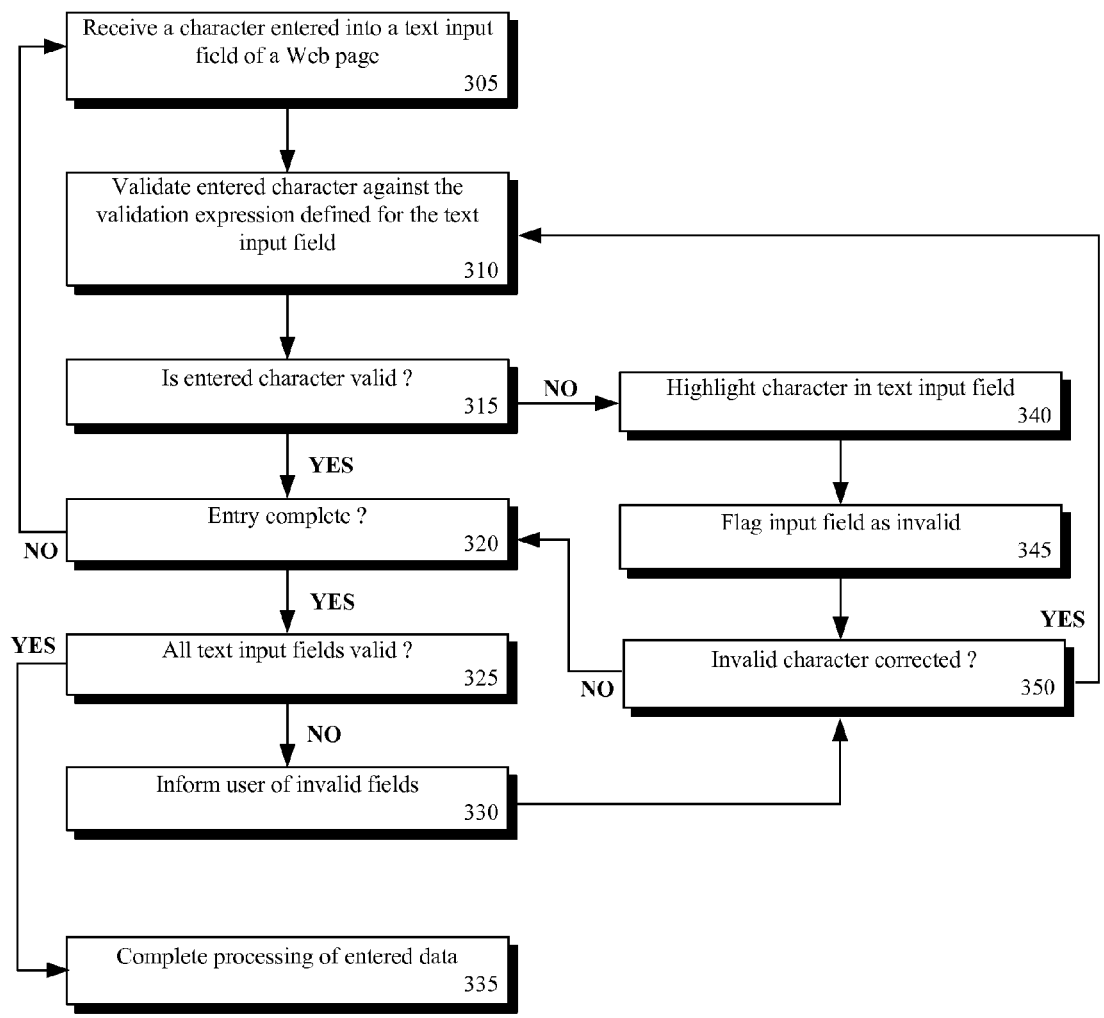
FIG. 3 is a flow chart of a method for providing real-time validation of a text input field of a Web page in accordance with an embodiment of the inventive arrangements disclosed herein.

FIG. 3 is a flow chart of a method 300 for providing real-time validation of a text input field of a Web page in accordance with an embodiment of the inventive arrangements disclosed herein. Method 300 can be performed in the context of system 100 and/or utilize the example operations of FIG. 2.

Method 300 can begin with step 305 where a character entered into a text input field of a Web page can be received. In step 310, the entered character can be validated against a validation expression defined for the text input field.

The system can determine if the entered character is valid in step 315. When the entered character is determined to be invalid, flow can branch to step 340 where the character can be highlighted in the text field.

In step 345, the text field can be flagged as invalid, which can delay the transmission of the text field data to its collection point until corrections are made and/or notify any other elements of the Web page that the data contained in the text field does not comply with the stated validation expression. For example, while the text field is flagged as invalid, transfer of the data to a database can be halted until the data meets the proper format.

In step 350, it can be determined if the invalid character has been corrected. If a correction to the invalid character has been made, flow can return to step 310 where the new character can be reevaluated. If a correction to the invalid character has not been made, flow can proceed to step 320.

It should be noted that a correction of an invalid character can include the removal of the invalid character, in which case the validation performed in step 310 would be of the set of entered characters minus the invalid character.

When the entered character is determined to be valid in step 315, step 320 can execute in which the system can determine if entry into the text field is complete. Examples of determining entry completion can include a timer, a change in focus of Web page elements, the execution of another Web page element, and the like.

If entry is not complete, flow can return to step 305 where the next character can be received and the steps of method 300 can reiterate until entry is complete. When entry is complete, step 325 can execute where the system can determine if all text input fields are valid.

When invalid fields are present, step 330 can execute where the user can be informed of the invalid fields. This step 330 can be in addition to the highlighting of invalid characters in the text field as performed in step 340. Once attention has been drawn to the text fields requiring attention, flow can proceed to step 350 and the branches of method 300 from that point.

When all text fields contain valid input, step 335 can execute where processing of the entered data can be completed. For example, valid data can be stored in a database table.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for providing real-time validation of text input fields in a Web page comprising:
  a validation-enhanced text input element configured to contain an attribute for a validation expression for a text field in a rendered Web page, wherein the validation-enhanced text input element is contained within a source code document corresponding to the rendered Web page;
  and an input text validator configured to validate a user-entered character of the text field against the validation expression in real-time and visually highlight invalid user-entered characters.

2. The system of claim 1, wherein the validation expression is written using a set of symbols and syntactic elements used to match patterns of text supported by the input text validator.

3. The system of claim 2, wherein the validation expression is expressed as a regular expression.

4. The system of claim 1, wherein the input text validator further comprises:
  a partial input expression generator configured to generate an expanded version of the validation expression, wherein the expanded version of the validation expression is used by the input text validator to determine a validity of the user-entered character regardless of invalid user-entered characters; and
  an invalid text highlighter configured to visually highlight the user-entered character when the user-entered character is determined as invalid for the validation expression.

5. The system of claim 1, wherein the source code document is written in a standardized markup language, wherein the standardized markup language is interpreted by a Web browser to present the rendered Web page.

6. The system of claim 5, wherein the standardized markup language is one of a hypertext markup language (HTML) and an extensible markup language (XML).

7. The system of claim 1, wherein the input text validator is written in a scripting language.

8. The system of claim 7, wherein the script is contained within the source code document.

9. The system of claim 7, wherein the script is invoked as a value of an attribute of the validation-enhanced text input element wherein invocation of the script occurs upon entry of the user-entered character.

10. A method for providing real-time validation of text input fields in a Web page comprising:
   receiving a user-entered character in a text field displayed in a Web page; immediately validating the user-entered character against a validation expression contained within a validation-enhanced text input element associated with the text field, wherein the validation expression defines a set of acceptable characters and character positions for the text field; and when the user-entered character is determined invalid, visually highlighting the user-entered character.

11. The method of claim 10, wherein a correction of an invalid user-entered character reiterates the validating step.

12. The method of claim 10, wherein the validating step further comprises:
   expanding the validation expression;
   comparing the received user-entered character against the expanded validation expression; and
   determining a validity of the received user-entered character based on a result of the comparing step.

13. The method of claim 10, wherein the marking step highlights the user-entered character determined as invalid in the text field.

14. The method of claim 10, further comprising:
   when the user-entered character is determined invalid, automatically denoting the text field as invalid.

15. The method of claim 10, wherein the validating step is performed by an input text validator, wherein the input text validator is invoked via an attribute of a validation-enhanced text input element that corresponds to the text field displayed in the Web page.

16. The method of claim 10, wherein the validation expression is written using a set of symbols and syntactic elements used to match patterns of text.

17. The method of claim 10, wherein said steps of claim 10 are performed by at least one machine in accordance with at least one computer program stored in a computer readable media, said computer programming having a plurality of code sections that are executable by the at least one machine.

18. An input text validator for validating a text field of a Web page in real-time comprising:
   a partial input expression generator configured to generate an expanded version of a validation expression, wherein the expanded version of the validation expression defines a set of acceptable characters and character positions for a text field of a Web page; and
   an invalid text highlighter configured to visually highlight a user-entered character in the text field when the user-entered character is determined as invalid for the expanded validation expression.

19. The input text validator of claim 18, wherein the validation expression is contained within a validation-enhanced text input element associated with the text field and is written using a set of symbols and syntactic elements used to match patterns of text.

20. The input text validator of claim 18, wherein the components of claim 18 are elements of a script written in a scripting language.

* * * * *